United States Patent
McGill

(12) United States Patent (10) Patent No.: US 6,554,176 B2
McGill (45) Date of Patent: Apr. 29, 2003

(54) METHOD OF MANUFACTURING A VEHICLE BODY AND FRAME ASSEMBLY INCLUDING AN ENERGY ABSORBING STRUCTURE

(75) Inventor: Scott M. McGill, Kenilworth, PA (US)

(73) Assignee: Dana Corporation, Toledo, OH (US)

( * ) Notice: Subject to any disclaimer, the term of this patent is extended or adjusted under 35 U.S.C. 154(b) by 82 days.

(21) Appl. No.: 09/809,234

(22) Filed: Mar. 15, 2001

(65) Prior Publication Data

US 2002/0130160 A1 Sep. 19, 2002

(51) Int. Cl.[7] .............................................. B23K 39/02
(52) U.S. Cl. ..................................... 228/112.1; 228/169
(58) Field of Search .............................. 228/112.1, 169; 293/133, 132; 104/254; 280/784; 296/189, 188

(56) References Cited

U.S. PATENT DOCUMENTS

| | | | | |
|---|---|---|---|---|
| 1,857,115 A | * | 5/1932 | Crawford | |
| 1,991,556 A | * | 2/1935 | Hopkins | |
| 3,452,424 A | * | 7/1969 | Morris | |
| 4,048,466 A | * | 9/1977 | Toth et al. | |
| 4,272,114 A | * | 6/1981 | Hirano et al. | |
| 4,431,221 A | | 2/1984 | Jahnle | |
| 5,118,160 A | | 6/1992 | Kitagawa et al. | |
| 5,431,445 A | | 7/1995 | Wheatley | |
| 5,460,317 A | | 10/1995 | Thomas et al. | |
| 5,480,189 A | | 1/1996 | Davies et al. | |
| 5,601,736 A | * | 2/1997 | Saitoh et al. | |
| 5,749,980 A | * | 5/1998 | Izuchi et al. | |
| 5,785,367 A | * | 7/1998 | Baumann et al. | |
| 5,853,195 A | | 12/1998 | Le et al. | |
| 5,876,077 A | | 3/1999 | Miskech et al. | |
| 6,003,934 A | | 12/1999 | Usui | |
| 6,116,829 A | * | 9/2000 | Gnann et al. | |
| 6,299,050 B1 | * | 10/2001 | Okamura et al. | |
| 6,302,476 B1 | | 10/2001 | Larsson et al. | |
| 6,378,264 B1 | | 4/2002 | Kawasaki et al. | |
| 2001/0038231 A1 | | 11/2001 | Takemoto et al. | |
| 2002/0000738 A1 | | 1/2002 | Larsson et al. | |

FOREIGN PATENT DOCUMENTS

| | | |
|---|---|---|
| DE | 19834775 | 2/2000 |
| GB | 2304621 | 3/1997 |

* cited by examiner

Primary Examiner—Tom Dunn
Assistant Examiner—Jonathan Johnson
(74) Attorney, Agent, or Firm—MacMillan, Sobanski & Todd, LLC

(57) ABSTRACT

A method of manufacturing a vehicle frame assembly includes forming a crush box that absorbs energy in a controlled manner during a collision. The crush box is formed by providing first and second members, each including a web portion having first and second flange portions extending therefrom that terminate in respective edges. The first and second members are aligned such that the edges of the flange portions of the first member are aligned with and abut the edges of the flange portions of the second member in a non-overlapping relationship. Then, a butt welding process is performed to secure the flange portions of the first member with the flange portions of the second member. Lastly, the crush box is secured to a portion of the vehicle frame assembly.

10 Claims, 3 Drawing Sheets

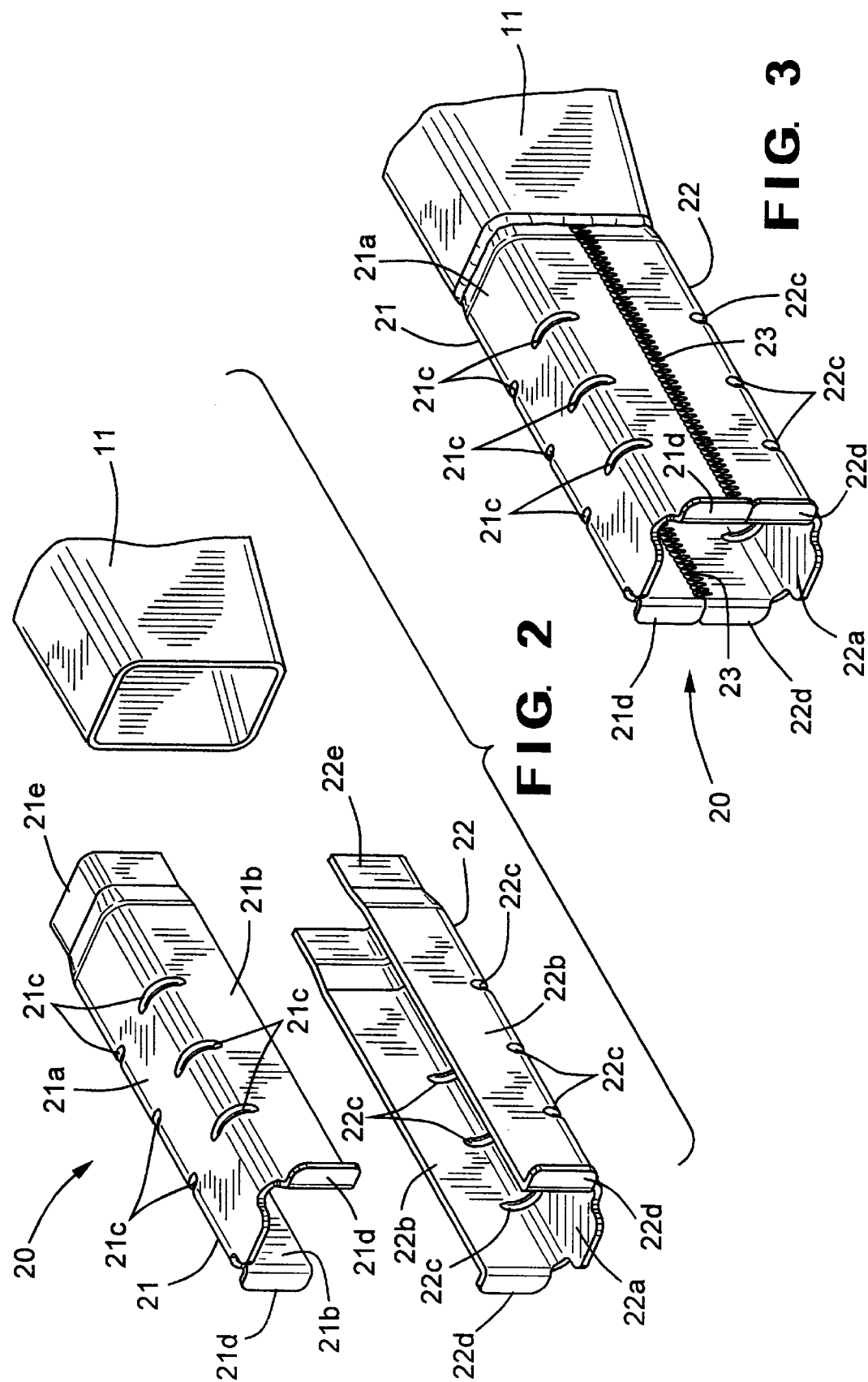

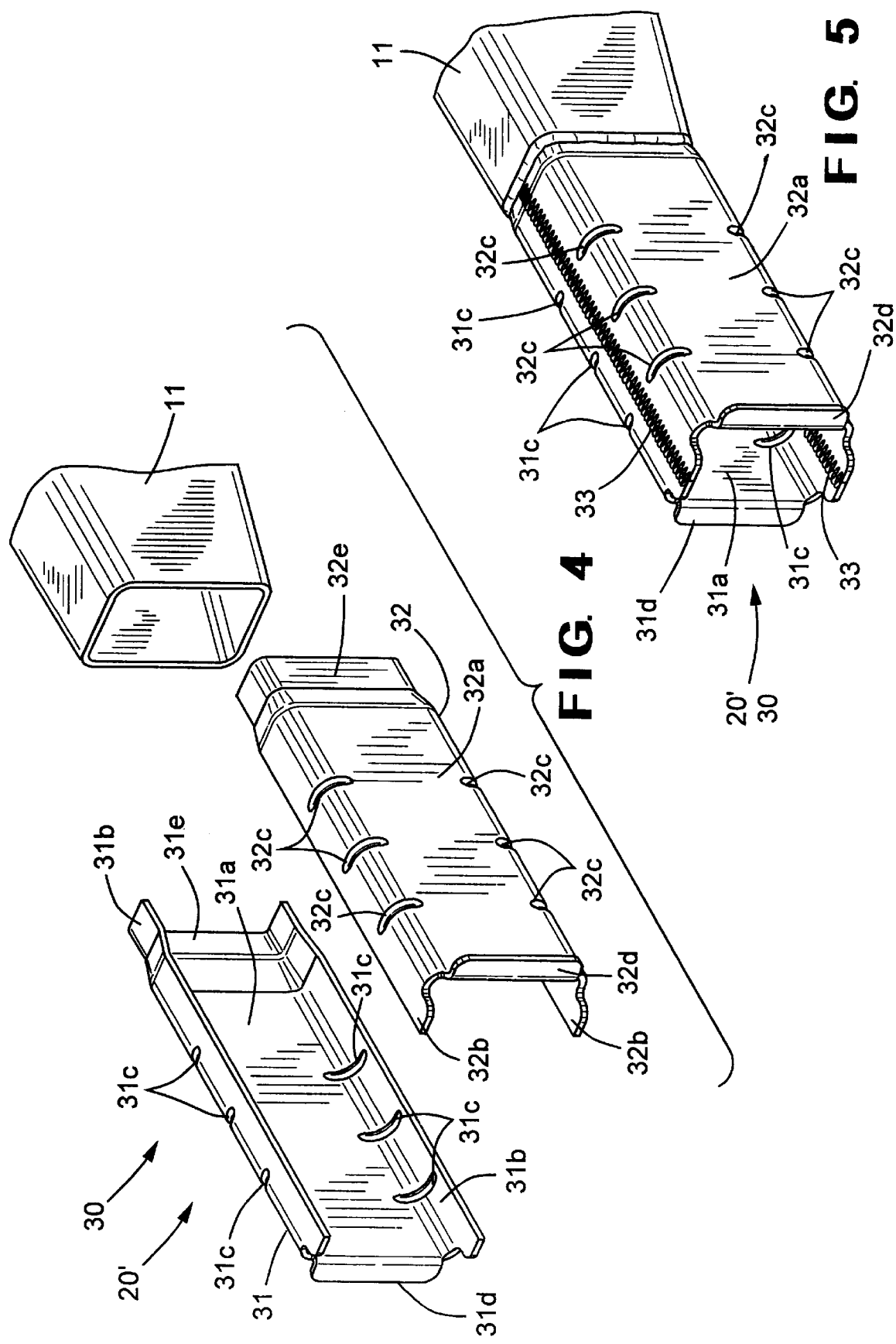

METHOD OF MANUFACTURING A VEHICLE BODY AND FRAME ASSEMBLY INCLUDING AN ENERGY ABSORBING STRUCTURE

BACKGROUND OF THE INVENTION

This invention relates in general to body and frame assemblies for vehicles. More specifically, this invention relates to an improved method for manufacturing such a vehicle body and frame assembly including a structure that is capable of absorbing energy in a controlled manner during a collision, thereby providing additional safety to the occupants of the vehicle.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design portions of the vehicle body and frame assembly so as to be at least partially collapsible during a collision so as to absorb to energy. To accomplish this, it is known to form such portions of the vehicle body and frame assembly to have corrugated or similarly deformed shapes that are somewhat weaker than the other non-deformed portions of the vehicle body and frame assembly. During a collisions, such deformed portions are designed to be the first portions of the vehicle body and frame assembly that are axially collapsed. Thus, the absorption of energy during a collision occurs in a somewhat controlled manner. A variety of such pre-deformed axially collapsible vehicle body and frame assembly structures are known in the art.

SUMMARY OF THE INVENTION

This invention relates to an improved method of manufacturing a vehicle body and frame assembly including a structure that is capable of absorbing energy in a controlled manner during a collision, thereby providing additional safety to the occupants of the vehicle. The vehicle body and frame assembly can, for example, include a pair of longitudinally extending side rails having a plurality of transverse cross members extending therebetween. One or more energy absorbing structures, referred to as a crush boxes, can be provided at the front end of each of the side rails or elsewhere on the vehicle body and frame assembly. The crush box is initially formed by providing first and second members, each including a web portion having first and second flange portions extending therefrom that terminate in respective edges. The first and second members are aligned such that the edge of the first flange portion of the first member is aligned with and abuts the edge of the first flange portion of the second member in a non-overlapping relationship, and such that the edge of the second flange portion of the first member is aligned with and abuts the edge of the second flange portion of the second member in a non-overlapping relationship. Then, a butt welding process is performed to secure the first flange portion of the first member with the first flange portion of the second member and to secure the second flange portion of the first member with the second flange portion of the second member. Lastly, the crush box is secured to a portion of the vehicle frame assembly.

Various objects and advantages of this invention will become apparent to those skilled in the art from the following detailed description of the preferred embodiments, when read in light of the accompanying drawings.

BRIEF DESCRIPTION OF THE DRAWINGS

FIG. 2 is an enlarged exploded perspective view of a portion of the vehicle body and frame assembly illustrated in FIG. 1 showing a first embodiment of a method of manufacturing the energy absorbing structure in accordance with this invention.

FIG. 3 is an enlarged perspective view of the portion of the vehicle body and frame assembly illustrated in FIG. 2 wherein the first embodiment of the energy absorbing structure is shown assembled.

FIG. 4 is an enlarged exploded perspective view of a portion of the vehicle body and frame assembly illustrated in FIG. 1 showing a second embodiment of a method of manufacturing the energy absorbing structure in accordance with this invention.

FIG. 5 is an enlarged perspective view of the portion of the vehicle body and frame assembly illustrated in FIG. 4 wherein the second embodiment of the energy absorbing structure is shown assembled.

DETAILED DESCRIPTION OF THE PREFERRED EMBODIMENTS

Figure 1:
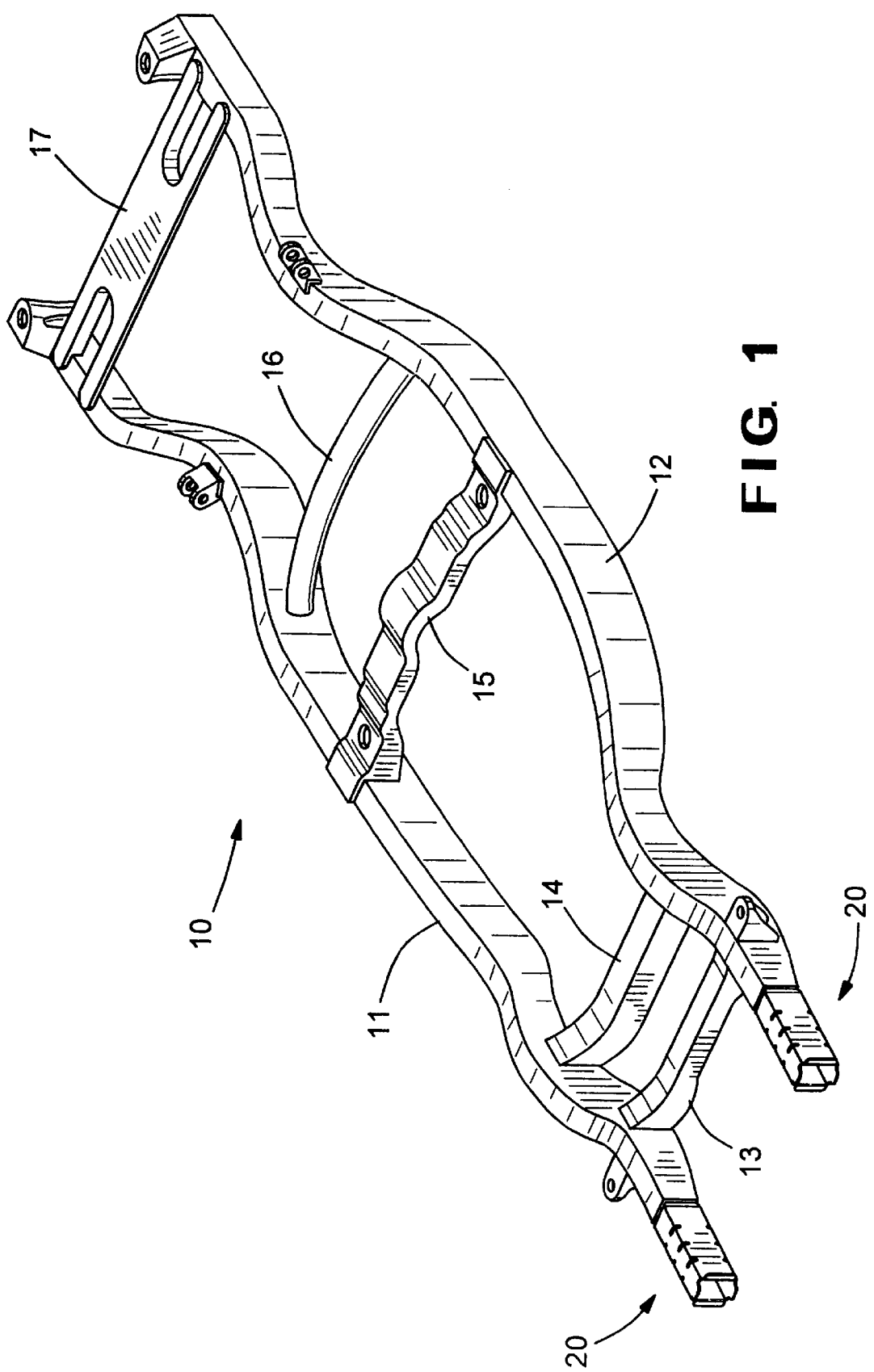
FIG. 1 is a perspective view of a vehicle body and frame assembly including an energy absorbing structure that has been manufactured in accordance with the method of this invention.

Referring now to the drawings, there is illustrated in FIG. 1 a portion of a vehicle body and frame assembly, indicated generally at 10, in accordance with this invention. The vehicle body and frame assembly 10 is generally conventional in the art, and only those portions thereof that are necessary for a complete understanding of this invention will be described and illustrated. Furthermore, it will be appreciated that the illustrated vehicle frame assembly 10 is intended to be representative of any conventional structure, separate or unitized, for a frame assembly for use in a vehicle. The illustrated vehicle frame assembly 10 is a ladder frame assembly including a pair of longitudinally extending side rails 11 and 12 or similar structural members having a plurality of transverse cross members 13, 14, 15, 16, and 17 extending therebetween. The side rails 11 and 12 and the cross members 13, 14, 15, 16, and 17 may be formed from any desired metallic material or materials, including steel, aluminum, and the like. The side rails 11 and 12 extend longitudinally throughout the entire length of the assembly 10 and are generally parallel to one another. Each of the side rails 11 and 12 in the illustrated embodiment is formed from a single closed channel structural member. However, it will be appreciated that one or both of the side rails 11 and 12 may be formed from a plurality of individually formed closed channel structural members that are secured together by any conventional means, such as by welding, riveting, bolting, and the like. Furthermore, portions of the side rails 11 and 12 may be formed from open channel structural members if desired.

The cross members 13 through 17 extend generally perpendicular to the side rails 11 and 12 and may be formed having any conventional structure. The cross members 13 through 17 are spaced apart from one another along the length of the ladder frame assembly 10 and can be secured to the side rails 11 and 12 by any conventional means, such as by welding, riveting, bolting, and the like. When secured to the side rails 11 and 12, the cross members 13 through 17 provide lateral and torsional rigidity to the ladder frame assembly 10. The structure of the vehicle body and frame assembly thus far described is conventional in the art.

An energy absorbing structure, indicated generally at 20, is provided at the front end of each of the side rails 11 and 12 of the vehicle body and frame assembly 10. Although this invention will be described and illustrated in the context of the illustrated pair of the energy absorbing structures 20 that are respectively provided at the front ends of the side rails 11 and 12, it will be appreciated that any number of such energy absorbing structures 20 may be provided at any desired location or locations on the vehicle body and frame assembly 10, such as at the rear ends of the side rails 11 and 12, for example.

FIGS. 2 and 3 illustrate a first embodiment of a method of manufacturing the energy absorbing structures 20 in accordance with this invention and for securing it to the front end of the side rail 11. As shown therein, the energy absorbing structure 20 is formed from first and second portions 21 and 22 that are secured together in the manner described below to form a crush box structure that, in turn, is secured to the front end of the side rail 11. The first portion 21 of the energy absorbing structure 20 is preferably formed from a single piece of a metallic material that has been stamped or otherwise deformed to have a generally U-shaped cross sectional configuration. Thus, the first portion 21 defines a generally horizontally extending web portion 21a having a pair of generally vertically extending flange portions 21b extending downwardly therefrom. One or more recesses 21c may be formed in the first portion 21 of the energy absorbing structure 20 for a purpose that will be described below. In the illustrated embodiment, three of such recesses 21c are formed at the junction of the generally horizontally extending web portion 21a with each of the generally vertically extending flange portions 21b. However, any desired number of such recesses 21c may be formed at any desired location or locations on the first portion 21. In the illustrated embodiment, the recesses 21c are formed as discontinuous dimples or darts. However, the recesses 21c may be formed as ribs that extend continuously throughout the entire extent of the first portion 21. The forward end of the first portion 21 may, if desired, be formed having a pair of angled portions 21d that extend respectively outwardly from the vertically extending flange portions 21b. Such angled portions 21d may be provided to facilitate the securement of another portion of the vehicle body and frame assembly 10 thereto, such as a bumper or similar structure. The rearward end of the first portion 21 may, if desired, be formed having a reduced size portion 21e for a purpose that will also be explained below.

The second portion 22 of the energy absorbing structure 20 is also preferably formed from a single piece of a metallic material that has been stamped or otherwise deformed to have a generally U-shaped cross sectional configuration. Thus, the second portion 22 defines a generally horizontally extending web portion 22a having a pair of generally vertically extending flange portions 22b extending upwardly therefrom. One or more recesses 22c may be formed in the second portion 22 of the energy absorbing structure 20 for a purpose that will be described below. In the illustrated embodiment, three of such recesses 22c are formed at the junction of the generally horizontally extending web portion 22a with each of the generally vertically extending flange portions 22b. However, any desired number of such recesses 22c may be formed at any desired location or locations on the second portion 22. In the illustrated embodiment, the recesses 22c are formed as discontinuous dimples or darts. However, the recesses 22c may be formed as ribs that extend continuously throughout the entire extent of the second portion 22. The forward end of the second portion 22 may, if desired, be formed having a pair of angled portions 22d that extend respectively outwardly from the vertically extending flange portions 22b. Such angled portions 22d may be provided to facilitate the securement of another portion of the vehicle body and frame assembly 10 thereto, such as a bumper or similar structure. The rearward end of the second portion 22 may, if desired, be formed having a reduced size portion 22e for a purpose that will also be explained below.

The energy absorbing structure 20 is assembled by moving the first and second portions 21 and 22 together such that the edges of the vertically extending flange portions 21b and 22b are respectively aligned with and abut one another in a non-overlapping relationship, as shown in FIG. 3. Then, a butt welding process is performed, such as shown at 23, to permanently secure the first and second portions 21 and 22 together to form the energy absorbing structure 20. The butt welding process may be accomplished using a friction welding process, a laser welding process, or an electronic beam welding process. Each of these three butt welding processes is, of itself, known to those skilled in the art. None of such butt welding process employ the use of a filler material, as is common in traditional welding processes. Consequently, the resulting weld between the first and second portions 21 and 22 is more ductile than would occur if such portions were secured together using traditional welding processes. This increased ductility reduces the chances of failure occurring in the longitudinally extending seams between the first and second portions 21 and 22 along the two lateral sides of the crush box. Because there is no overlap between the flange portions 21c and 22c of the first and second portion 21 and 22, respectively, the finished energy absorbing section 20 behaves similarly to a seamless tube.

Furthermore, the use of the butt welding process facilitates the securement of the first and second portions 21 and 22, even when such portions 21 and 22 have been stamped or otherwise formed to include various irregular shapes. For example, as mentioned above, the first and second portions 21 and 22 are formed having respective pluralities of recesses 21c and 22c. Such recesses 21c and 22c can be provided as crush initiators that allow the energy absorbing structure 20 to collapse longitudinally when a force of at least a predetermined minimum magnitude is applied thereto. As is well known, this collapsing of the energy absorbing structure 20 functions to absorb energy in a controlled manner during a collision, thereby providing additional safety to the occupants of the vehicle. However, the first and second portions 21 and 22 may be stamped or otherwise formed to include various other desired shapes (not shown) that may, for example, facilitate the attachment of various components to the vehicle body and frame assembly 10. The first and second portions 21 and 22 of the energy absorbing structure 20 may be formed from any desired metallic material or materials, including steel, aluminum, and the like.

Once assembled, the energy absorbing structure 20 can be secured to the forward end of the side rail 11 in any conventional manner. In the illustrated embodiment, the cooperating reduced size portions 21e and 22e provided at the rearward end of the energy absorbing structure 20 are sized to be inserted telescopically within the forward end of the side rail 11. Then, the rearward end of the energy absorbing structure 20 is secured to the forward end of the side rail 11 in any desired manner, such as by using a traditional welding process as discussed above.

FIGS. 4 and 5 illustrate a second embodiment of a method of manufacturing the energy absorbing structures 20 in accordance with this invention and for securing it to the front end of the side rail 11. As shown therein, the modified energy absorbing structure 30 is formed from first and second portions 31 and 32 that are secured together in the manner described below to form a crush box structure that, in turn, is secured to the front end of the side rail 11. The first portion 31 of the energy absorbing structure 30 is preferably formed from a single piece of a metallic material that has been stamped or otherwise deformed to have a generally C-shaped cross sectional configuration. Thus, the first portion 31 defines a generally vertically extending web portion 31a having a pair of generally horizontally extending flange portions 31b extending therefrom. One or more recesses 31c may be formed in the first portion 31 of the energy absorbing structure 30 for a purpose that will be described below. In the illustrated embodiment, three of such recesses 31c are formed at the junction of the generally vertically extending web portion 31a with each of the generally horizontally extending flange portions 31b. However, any desired number of such recesses 31c may be formed at any desired location or locations on the first portion 31. In the illustrated embodiment, the recesses 31c are formed as discontinuous dimples or darts. However, the recesses 31c may be formed as ribs that extend continuously throughout the entire extent of the first portion 31. The forward end of the first portion 31 may, if desired, be formed having a pair of angled portions 31d that extend respectively outwardly from the vertically extending web portion 31a. Such angled portions 31d may be provided to facilitate the securement of another portion of the vehicle body and frame assembly 10 thereto, such as a bumper or similar structure. The rearward end of the first portion 31 may, if desired, be formed having a reduced size portion 31e for a purpose that will also be explained below.

The second portion 32 of the energy absorbing structure 30 is also preferably formed from a single piece of a metallic material that has been stamped or otherwise deformed to have a generally C-shaped cross sectional configuration. Thus, the second portion 32 defines a generally vertically extending web portion 32a having a pair of generally horizontally extending flange portions 32b extending therefrom. One or more recesses 32c may be formed in the second portion 32 of the energy absorbing structure 30 for a purpose that will be described below. In the illustrated embodiment, three of such recesses 32c are formed at the junction of the generally vertically extending web portion 32a with each of the generally horizontally extending flange portions 32b. However, any desired number of such recesses 32c may be formed at any desired location or locations on the second portion 32. In the illustrated embodiment, the recesses 32c are formed as discontinuous dimples or darts. However, the recesses 32c may be formed as ribs that extend continuously throughout the entire extent of the second portion 32. The forward end of the second portion 32 may, if desired, be formed having a pair of angled portions 32d that extend respectively outwardly from the horizontally extending web portion 32a. Such angled portions 32d may be provided to facilitate the securement of another portion of the vehicle body and frame assembly 10 thereto, such as a bumper or similar structure. The rearward end of the second portion 32 may, if desired, be formed having a reduced size portion 32e for a purpose that will also be explained below.

The energy absorbing structure 30 is assembled by moving the first and second portions 31 and 32 together such that the edges of the horizontally extending flange portions 31b and 32b are respectively aligned with and abut one another in a non-overlapping relationship, as shown in FIG. 5. Then, a butt welding process is performed, such as shown at 33, to permanently secure the first and second portions 31 and 32 together to form the energy absorbing structure 30. The butt welding process may be accomplished using a friction welding process, a laser welding process, or an electronic beam welding process. Each of these three butt welding processes is, of itself, known to those skilled in the art. None of such butt welding process employ the use of a filler material, as is common in traditional welding processes. Consequently, the resulting weld between the first and second portions 31 and 32 is more ductile than would occur if such portions were secured together using traditional welding processes. This increased ductility reduces the chances of failure occurring in the longitudinally extending seams between the first and second portions 31 and 32 along the upper and lower sides of the crush box. Because there is no overlap between the flange portions 31c and 32c of the first and second portion 31 and 32, respectively, the finished energy absorbing section 30 behaves similarly to a seamless tube.

Furthermore, the use of the butt welding process facilitates the securement of the first and second portions 31 and 32, even when such portions 31 and 32 have been stamped or otherwise formed to include various irregular shapes. For example, as mentioned above, the first and second portions 31 and 32 are formed having respective pluralities of recesses 31c and 32c. Such recesses 31c and 32c can be provided as crush initiators that allow the energy absorbing structure 30 to collapse longitudinally when a force of at least a predetermined minimum magnitude is applied thereto. As is well known, this collapsing of the energy absorbing structure 30 functions to absorb energy in a controlled manner during a collision, thereby providing additional safety to the occupants of the vehicle. However, the first and second portions 31 and 32 may be stamped or otherwise formed to include various other desired shapes (not shown) that may, for example, facilitate the attachment of various components to the vehicle body and frame assembly 10. The first and second portions 31 and 32 of the energy absorbing structure 30 may be formed from any desired metallic material or materials, including steel, aluminum, and the like.

Once assembled, the energy absorbing structure 30 can be secured to the forward end of the side rail 11 in any conventional manner. In the illustrated embodiment, the cooperating reduced size portions 31e and 32e provided at the rearward end of the energy absorbing structure 30 are sized to be inserted telescopically within the forward end of the side rail 11. Then, the rearward end of the energy absorbing structure 30 is secured to the forward end of the side rail 11 in any desired manner, such as by using a traditional welding process as discussed above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a vehicle frame assembly comprising the steps of:
   (a) forming a crush box by:
      (1) providing a first member including a web portion having first and second flange portions extending therefrom that terminate in respective edges;
      (2) providing a second member including a web portion having first and second flange portions extending therefrom that terminate in respective edges;
      (3) orienting the first and second members such that the edge of the first flange portion of the first member is aligned with and abuts the edge of the first flange portion of the second member in a non-overlapping relationship, and such that the edge of the second flange portion of the first member is aligned with and abuts the edge of the second flange portion of the second member in a non-overlapping relationship;
      (4) performing a butt welding process to secure the first flange portion of the first member with the first flange portion of the second member and to secure the second flange portion of the first member with the second flange portion of the second member; and
   (b) providing a vehicle frame assembly; and
   (c) securing the crush box to a portion of the vehicle frame assembly.

2. The method defined in claim 1 wherein said step (a)(1) is performed by providing a first member having generally U-shaped cross sectional configuration including a generally horizontally extending web portion having a pair of generally vertically extending flange portions extending therefrom, and wherein said step (a)(2) is performed by providing a second member having generally U-shaped cross sectional configuration including a generally horizontally extending web portion having a pair of generally vertically extending flange portions extending therefrom.

3. The method defined in claim 1 wherein said step (a)(1) is performed by providing a first member having generally C-shaped cross sectional configuration including a generally vertically extending web portion having a pair of generally horizontally extending flange portions extending therefrom, and wherein said step (a)(2) is performed by providing a second member having generally C-shaped cross sectional configuration including a generally vertically extending web portion having a pair of generally horizontally extending flange portions extending therefrom.

4. The method defined in claim 1 wherein said step (a)(1) is performed by forming a recess in the first member, and wherein said step (a)(2) is performed by forming a recess in the second member.

5. The method defined in claim 1 wherein said step (a)(1) is performed by forming a plurality of recesses in the first member, and wherein said step (a)(2) is performed by forming a plurality of recesses in the second member.

6. The method defined in claim 1 wherein said step (a)(4) is performed by friction stir welding.

7. The method defined in claim 1 wherein said step (a)(4) is performed by laser welding.

8. The method defined in claim 1 wherein said step (a)(4) is performed by electron beam welding.

9. The method defined in claim 1 wherein said step (c) is performed by forming the crush box to have a reduced size portion, inserting a portion of the. reduced sized portion of the crush box within a portion of the vehicle frame assembly, and securing the crush box to the vehicle frame assembly 10. The method defined in claim 1 wherein said step (c) is performed by welding.

* * * * *